Patented Dec. 10, 1946

2,412,371

UNITED STATES PATENT OFFICE 2,412,371

MANUFACTURE OF GASOLINE

John W. Teter, Chicago, Ill., assignor to Sinclair Refining Company, New York, N. Y., a corporation of Maine No Drawing. Application December 19, 1940, Serial No. 370,837

6 Claims. (Cl. 196—54)

This invention relates to improvements in the manufacture of gasoline by a cracking process of the catalytic type. More particularly the invention relates to an improved catalytic cracking process of the class wherein the cracking catalyst is of the type which functions by adsorption, activation and desorption as distinguished from cracking catalysts which, like anhydrous aluminum chloride, function in the Friedel-Crafts type of reaction. Examples of cracking catalysts of the type first mentioned are naturally occurring clays, acid-treated clays and synthetic catalysts comprising silica and alumina, or silica and alumina together with other metal oxides.

Prior to the discovery of the invention herein described, the most active of the catalysts of the first type known to me was a powdered synthetic catalyst composed of 90% silica and 10% alumina by weight, prepared by precipitating aqueous sodium silicate with hydrochloric acid in the presence of added sodium chloride, adding aluminum chloride solution and precipitating with ammonium hydroxide, washing, drying at 250° F., crushing and sizing. Cracking in the presence of this catalyst has been found to produce a marked improvement both in the anti-knock value of the gasoline produced and in the gasoline yield, together with a substantial decrease in the amount of gas formed.

I have now found that crystalline aluminum fluoride, either by itself or together with metal oxides such as alumina, is an active cracking catalyst of even greater activity than the most active of the synthetic silica-alumina catalyst heretofore employed. The aluminum fluoride employed in the process of my invention is used in powdered form and may contain varying amounts of combined and uncombined water. It may be represented by the formula $AlF_3 \cdot XH_2O$. In the cracking process of my invention I merely subject the oil to be cracked, in the presence of the aluminum fluoride catalyst, to a temperature approximating 900–1050° F., preferably about 1000° F., for a period of time sufficient to effect a substantial amount of cracking. Substantial superatmospheric pressure may be applied to the oil during treatment if desired. However, I prefer to use a pressure not substantially above thirty pounds per square inch as the use of higher pressures impairs the anti-knock properties of the resultant gasoline. The aluminum fluoride catalyst may be arranged in a fixed bed and the oil to be cracked vaporized and passed therethrough at the desired temperature, or the catalyst in powdered form may be dispersed through the oil or oil vapors and the mixture passed through a heating zone in which the desired temperature is maintained.

Aluminum fluoride is quite stable and has a melting point of 1040° C., far in excess of the temperatures at which it is most effective. However, when supplied in the anhydrous state it appears to have little catalytic activity. In these respects it differs from aluminum chloride which sublimes at a temperature of approximately 179° C. and which has significant catalytic activity only when supplied in the anhydrous state.

The following examples illustrate the effect of my aluminum fluoride catalyst, as compared to thermal cracking and to the effect of the synthetic silica-alumina catalyst previously described. In each of the following operations the charging oil was a Pennsylvania gas oil having the following characteristics:

Gravity _____ °API__ 37.8
Distillation:
    Initial _____ °F__ 472
    10% _____ °F__ 572
    50% _____ °F__ 598
    90% _____ °F__ 648
    End point _____ °F__ 674

In each operation the oil, alone or admixed with a predetermined percentage of catalyst by weight based on the oil, was passed through a heating coil of the same length and at substantially the same feed rate. During passage therethrough the oil was first heated to, and then maintained at, the desired predetermined temperature. Pressure was controlled to maintain the desired predetermined pressure at the outlet of the heating coil. The total products discharged from the coil were cooled to condense all normally liquid hydrocarbons in the form of a synthetic crude. After separation of the catalyst, by hot filtration, the gasoline fraction was recovered from the synthetic crude by distillation and stabilization. Thus the gasoline yields are those obtained by a single once-through treatment, all recycling being avoided in order to eliminate errors in obtaining comparative results.

Three operations with no catalyst were first carried out at temperatures of 950° F., 1000° F. and 1050° F., respectively, and with a coil outlet pressure of 30 pounds per square inch to calibrate the apparatus for thermal cracking with respect to the particular oil used. Three similar additional operations were then carried out under the same three sets of operating conditions but with 1% by weight of finely divided crystalline aluminum fluoride of reagent grade admixed with the oil. A fresh sample of the crystalline aluminum fluoride catalyst used in these operations was completely dehydrated in a muffle furnace and the weight loss indicated an original water content of 2.35 $H_2O \cdot AlF_3$. The octane number of the produced gasoline was determined in each instance both by the motor method (M. M.) and by the research method (Res. M.). The following table gives the results obtained:

| | | | |
|---|---|---|---|
| Temperature _____ °F__ | 950 | 1,000 | 1,050 |
| Pressure _____ pounds__ | 30 | 30 | 30 |
| Gasoline yield per cent on charge: | | | |
| Thermal _____ | 11.8 | 21.0 | 24.5 |
| 1% $AlF_3 \cdot XH_2O$ _____ | 17.5 | 23.2 | 28.8 |
| Gas, cu. ft./bbl. of gasoline: | | | |
| Thermal _____ | 991 | 1,632 | 2,686 |
| 1% $AlF_3 \cdot XH_2O$ _____ | 363 | 906 | 2,340 |
| Octane number (M. M.—Res. M.): | | | |
| Thermal _____ | 63.7–74.4 | 67.7–80.0 | 69.5–82.2 |
| 1% $AlF_3 \cdot XH_2O$ _____ | 76.9–89.5 | 76.1–90.0 | 72.4–85.4 |

Another operation with the same charging oil was carried out at 1000° F. with 1% of the crystalline aluminum fluoride catalyst but with a coil discharge pressure of 75 pounds per square inch. The following results were obtained:

Gasoline yield _____ per cent__ 28.5
Gas, cubic feet per barrel of gasoline_____ 1,240
Octane number (M. M.—Res. M.) ____ 73.2–86.0

Comparison of these results with those obtained at a pressure of 30 pounds per square inch but at the same operating temperature shows that the increase in gasoline yield obtained by increasing the operating pressure is accompanied by a decrease in the anti-knock value of the gasoline.

Two additional tests were carried out at pressures of 30 pounds per square inch and at temperatures of 950° F. and 1000° F., respectively, with 1% of the previously described synthetic silica-alumina catalyst dispersed in the oil. The charging oil and the pressure employed were the same as in the tests previously described. The results obtained, together with those obtained under similar operating conditions but with 1% of the aluminum fluoride catalyst, are given in the following table:

| | | |
|---|---|---|
| Temperature _____ °F__ | 950 | 1,000 |
| Pressure _____ pounds__ | 30 | 30 |
| Gasoline yield per cent on charge: | | |
| 1% silica-alumina catalyst _____ | 13.9 | 20.9 |
| 1% aluminum fluoride catalyst _____ | 17.5 | 23.2 |
| Gas cu. ft./bbl. of gasoline: | | |
| 1% silica-alumina catalyst _____ | 576 | 1,234 |
| 1% aluminum fluoride catalyst _____ | 363 | 906 |
| Octane M. M. and Res. M.: | | |
| 1% silica-alumina catalyst _____ | 76.5–89.7 | 75.7–87.9 |
| 1% aluminum fluoride catalyst _____ | 76.9–89.5 | 76.1–90.0 |

As the foregoing tests illustrate, the results obtained with the aluminum fluoride catalyst are markedly superior to those obtainable with thermal cracking at temperatures ranging from below 950° F. to upwards of 1050° F. from the standpoint of the gasoline yield, the amount of gas produced and the anti-knock value of the gasoline. However, when the temperature substantially exceeds 1000° F. the resulting increase in gasoline yield is obtained only at the expense of a substantial increase in gas production and a reduction in the anti-knock value of the gasoline. The tests further illustrate the fact that within the preferred operating range the anti-knock values obtainable with the aluminum fluoride catalyst are as good or better than those obtainable with the synthetic silica-alumina catalyst, while with the aluminum fluoride catalyst there is a substantial increase in the gasoline yield and a substantial decrease in the amount of gas produced as compared to the silica-alumina catalyst.

A heterogeneous aluminum fluoride catalyst was prepared by treating alumina with sufficient aqueous hydrofluoric acid to yield a 50:50 mixture of $AlF_3$:$Al_2O_3$. A test, using the same charging oil and same procedure as previously described, was made at a temperature of 1000° F. and at a pressure of 30 pounds per square inch with 1% of this heterogeneous aluminum fluoride catalyst dispersed in the oil. The results obtained, together with those obtained under similar conditions but using the reagent grade of aluminum fluoride as the catalyst, are given in the following table:

| Catalyst | Gasoline yield, per cent by volume | Gas, cu. ft. per bbl. of gasoline | Octane number (M. M.—Res. M.) |
|---|---|---|---|
| $AlF_3 \cdot XH_2O$ (reagent grade) | 23.2 | 906 | 76.1–90.0 |
| $AlF_3$:$Al_2O_3$ (50:50) | 25.5 | 936 | 76.2–89.1 |

It will be noted that the heterogeneous aluminum fluoride catalyst produced a greater gasoline yield than did the reagent grade aluminum fluoride catalyst, the anti-knock value of the gasoline being substantially the same in both instances. Yet alumina alone has very little activity as a cracking catalyst.

I claim:

1. The improvement in cracking hydrocarbon oils for the production of high anti-knock gasolines which comprises subjecting the oil to cracking temperature in the presence of finely divided crystalline aluminum fluoride.

2. The improvement in cracking hydrocarbon oils for the production of high anti-knock gasoline which comprises subjecting the oil to cracking temperature in the presence of finely divided aluminum fluoride containing combined moisture.

3. The improvement in cracking hydrocarbon oils for the production of high anti-knock gasoline which comprises dispersing a small amount of a finely-divided crystalline aluminum fluoride in the oil to be cracked and subjecting the mixture to a temperature approximating 950° F.–1000° F. for a period of time sufficient to convert a substantial proportion of the oil into high anti-knock gasoline.

4. The improvement in cracking hydrocarbon oils for the production of high anti-knock gasoline which comprises dispersing a small amount of finely-divided crystalline aluminum fluoride in the oil to be cracked and subjecting the mixture to a temperature approximating 950°–1000° F. at a pressure not substantially exceeding 30 pounds per square inch for a period of time sufficient to convert a substantial proportion of the oil into high octane gasoline.

5. The improvement in cracking hydrocarbon oils for the production of high anti-knock gasoline which comprises subjecting the oil to a cracking temperature in the presence of a finely-divided catalyst comprising alumina and crystalline aluminum fluoride.

6. The improvement in cracking hydrocarbon oils for the production of high anti-knock gasoline which comprises subjecting the oil to cracking temperature in the presence of aluminum fluoride containing combined moisture.

JOHN W. TETER.